US007267958B2

(12) United States Patent
Dordick et al.

(10) Patent No.: US 7,267,958 B2
(45) Date of Patent: Sep. 11, 2007

(54) BIOCATALYTIC SOLGEL MICROARRAYS

(75) Inventors: Jonathan S. Dordick, Schenectady, NY (US); Douglas S. Clark, Orinda, CA (US)

(73) Assignees: Rensselaer Polytechnic Institute, Troy, NY (US); The Regents of the University of California, Oakland, CA (US)

( * ) Notice: Subject to any disclaimer, the term of this patent is extended or adjusted under 35 U.S.C. 154(b) by 611 days.

(21) Appl. No.: 10/287,442

(22) Filed: Nov. 1, 2002

(65) Prior Publication Data

US 2003/0162284 A1 Aug. 28, 2003

Related U.S. Application Data

(60) Provisional application No. 60/336,045, filed on Nov. 1, 2001.

(51) Int. Cl.
*G01N 33/53* (2006.01)
(52) U.S. Cl. ...................................... 435/7.1
(58) Field of Classification Search .................. 435/4, 435/7.1, 6, 7.2, 7.4, 7.6, 7.8, 7.9, 7.91–7.95, 435/283.1, 285.2, 287.1, 287.2, 287.7, 287.9, 435/288.3, 288.6, 288.7, 973; 436/514–519, 436/523, 524, 531, 532, 535; 422/50, 55, 422/56, 61
See application file for complete search history.

(56) References Cited

U.S. PATENT DOCUMENTS

| | | | |
|---|---|---|---|
| 3,650,900 A | | 3/1972 | Levin et al. |
| 5,200,334 A | | 4/1993 | Dunn et al. |
| 5,474,915 A | | 12/1995 | Dordick et al. |
| 5,552,270 A | * | 9/1996 | Khrapko et al. ............... 435/6 |
| 5,618,933 A | | 4/1997 | Dordick et al. |
| 5,763,430 A | | 6/1998 | Zasloff |
| 5,824,526 A | | 10/1998 | Avnir et al. |
| 5,854,030 A | | 12/1998 | Dordick et al. |
| 6,017,760 A | | 1/2000 | Jauregui et al. |
| 6,051,380 A | | 4/2000 | Sosnowski et al. |
| 6,303,290 B1 | | 10/2001 | Liu et al. |
| 6,573,369 B2 | * | 6/2003 | Henderson et al. ......... 536/23.1 |
| 6,660,481 B2 | | 12/2003 | Rosenquist et al. |
| 6,780,584 B1 | * | 8/2004 | Edman et al. ................ 435/6 |
| 2001/0055797 A1 | | 12/2001 | Conroy et al. |
| 2002/0015952 A1 | | 2/2002 | Anderson et al. |
| 2002/0020931 A1 | | 2/2002 | Stowell et al. |
| 2002/0028506 A1 | | 3/2002 | Ho et al. |

FOREIGN PATENT DOCUMENTS

| | | |
|---|---|---|
| WO | WO 00/54882 | 9/2000 |
| WO | WO 00/54882 A1 | 9/2000 |
| WO | WO 02/10761 A1 | 2/2002 |

OTHER PUBLICATIONS

Livage et al., "Encapsulation of biomolecules in silica gels", Journal of Physics; Condensed Matter, vol. 13, pp. R673-R69, (2001).*
Buters et al., "cDNA-Directed Expression of Human Cytochrome p450 CYP1A1 using Baculovirus . . . ", Drug Metabolism and Disposition, vol. 23, No. 7, pp. 696-701, (1995).*
Chauret N., et al., "Description of a 96-well plate assay to measure cytochromes p4503A inhibition in human liver microsomes using a selective fluorescent probe," *Anal. Biochem.*, 276: 215-226 (1999).
Crespi, C.L., et al., "Microtiter plate assays for inhibition of human, drug-metabolism cytochromes P450," *Anal. Biochem.*, 248: 188-190 (1997).
Gill, I., et al., "Encapsulation of biologicals within silicate, siloxane, and hybrid sol-gel polymers: an efficient and generic approach," *J. Am. Chem. Soc.*, 120(34):8587-8597 (1998).
Gill, I., et al., "Bioencapsulation within synthetic polymers (Part 1): sol-gel encapsulated biologicals," *TIBTECH*, 18:282-296 (2000).
Iwatsubo, T., et al., "Prediction of in vivo drug metabolism in the human liver from in vitro metabolism data," *Pharmacol. Ther.*, 73: 147-171 (1997).
Kim, Y., et al., "Stable sol-gel microstructured and microfluidic networks for protein patterning," *Biotechnology & Bioengineering*, 73(5): 331-337 (2001).
Kim, J., et al., "Protease-containing silicates as active antifouling materials," *Biotechnology Prog.*, 18(3): 551-555 (2002).
Lake, B.G., et al., "Induction of CYP3A Isoforms in cultured precision-cut human liver slices," *Xenobiotica* 27: 1165-1173 (1997).
Nagy, G., et al., "Amperometric microcell for enzyme activity measurements," *Analytical Chemistry*, 70(10):2156-2162 (1998).
Novick, S.J., et al., "Preparation of active and stable biocatalytic hydrogels for use in selective transformations," *Chemistry of Materials*, 10(4): 955-958 (1998).
Novick, S.J., et al., "Investigating the effects of polymer chemistry on activity of biocatalytic plastic materials," *Biotechnology and Bioengineering*, 68(6): 665-671 (2000).
Park, C.B., et al., "Sol-gel encapsulated enzyme arrays for high-throughput screening of biocatalytic activity," *Biotechnology & Bioengineering*, 78(2): 229-235 (2002).
Sergeeva, M.V., et al., "Peptide synthesis using proteases dissolved in organic solvents," *Enzyme Microbial Technogy*, 20: 623-628 (1997).
Silber, P.M., et al., "In vitro methods for predicting human toxicity," *Lab Animal*, 23: 33-37 (1994).
Wang, P., et al., "Biocatalytic plastics as active and stable materials for biotransformations," *Nature Biotechnology*, 15: 789-793 (1997).
Zomorodi, K. et al., "Kinetics of diazepam metabolism in rat hepatic microsomes and hepatocytes and their use in predicting in vivo hepatic clearance," *Xenobiotica*, 25: 907-916 (1995).

* cited by examiner

*Primary Examiner*—Ann Yen Lam
(74) *Attorney, Agent, or Firm*—Elmore Patent Law Group, P.C.; Carolyn S. Elmore; Darlene A. Vanstone

(57) ABSTRACT

A system and method for conducting high-throughput interactions between test compositions and analytes, comprising one or more test compositions, and a plurality of independent micromatrices, wherein each said micromatrix encapsulates at least one said test composition; and said micromatrices are made of a material that is permeable to an analyte.

36 Claims, No Drawings

BIOCATALYTIC SOLGEL MICROARRAYS

RELATED APPLICATION

This application claims the benefit of U.S. Provisional Application No. 60/336,045, filed on Nov. 1, 2001, the entire teachings of which are incorporated herein by reference.

GOVERNMENT SUPPORT

The invention was supported, in whole or in part, by grant number BES-9902878 from the National Science Foundation. The Government has certain rights in the invention.

BACKGROUND OF THE INVENTION

Chemicals affect living organisms in both positive and negative ways. A new drug can save lives, or an environmental contaminant can create health problems. Sometimes, the same chemical can have both positive and negative effects, such as a drug that cures a disease but also has side effects. Multiple chemicals can interact to produce unexpected effects, for example when some medications taken in combination lead to side effects. For example, terfenadine (SELDANE®) was removed from the market in 1998 because its interaction with other drugs resulted in fatal heart arrhythmias. One study in the U.S. attributed as many as 100,000 deaths per year in the U.S. to such adverse drug reactions (ADR), making it between the $4^{th}$ and $6^{th}$ leading cause of death.

Chemicals can have different effects on different organisms, for example, potential drugs that work in animal studies, but later fail in human trials. Chemical effects also differ between individuals. Many medications only help a percentage of patients because patients respond to drugs in different ways. Chemicals effects also vary between body tissues. For example, some environmental toxins affect specific organs like the liver or the brain.

A major reason for these differences is that species, individuals, and organs all have different kinds and amounts of enzymes. Enzymes are part of the machinery of living cells that allow cells to react to drugs and to break down chemicals. In humans, a large group of enzymes in the liver are responsible for the majority of drug interactions and side effects. Different levels of these enzymes are responsible for many of the variations in the effects of chemicals.

There is a need for a technology to rapidly, effectively, and economically test the health effects of chemicals. Such chemicals include potential new life-saving pharmaceuticals, environmental contaminants, workplace toxins, potential carcinogens, and beneficial food chemicals, among many others. Current methods either involve testing on live animals, which can be time-consuming and costly, or involve testing in the laboratory, which is often not relevant to human health.

At the same time, there is a need for a technology to speed up the drug development process. One major bottleneck in the race to develop new life-saving treatments is the optimization of new drug candidates. When a potential new drug is discovered, teams of chemists often modify its chemical structure to create new compounds, and then screen them for improved efficacy and reduced side effects. This process currently is extremely expensive, intricate, time-consuming, and labor intensive, and generates significant amounts of chemical waste. These drawbacks can severely limit the number of optimizations that can be tried, so the final drug resulting from the process may not be the best drug that is possible.

There is therefore a need across many different disciplines for a technology to rapidly, effectively, and economically test the health effects of chemicals. In particular, there is a need for a technology to test chemicals, especially pharmaceuticals, on human metabolic enzymes. Furthermore, there is a need to optimize new drug candidates rapidly and economically.

SUMMARY OF THE INVENTION

Disclosed herein is a microarray chip that allows rapid, effective, and economical testing of the biological effects of chemicals, including pharmaceuticals. The invention can also be used to rapidly and economically synthesize variations of drug candidates and test their biological effects.

An apparatus of the invention includes one or more test compositions, and a plurality of independent, permeable micromatrices, that each encapsulate at least one test composition.

A method of the invention is high-throughput screening using the disclosed apparatus to detect a reaction having a desired feature. The method includes combining one or more distinct applied compositions with the micromatrices of the apparatus under conditions suitable for reacting the applied compositions with the test compositions. Another step is assaying each reaction above for a desired feature.

The advantages of the invention disclosed herein are significant. The invention combines rapid testing of chemicals for pharmaceutical benefit, toxicity, side effects, and interactions between drugs. By providing microarrays, the invention allows the use of microscopically small amounts of expensive enzymes and chemicals. By encapsulating test compositions in micromatrices, the invention allows precious constituents to be reused. By combining cell-based assays with a microarray, the invention allows biologically relevant results to be obtained directly.

Furthermore, the invention provides for a significant and surprising advance in high-throughput lead optimization of drug candidates. The invention allows multiple drug candidates to be chemically modified, producing a range of drug variants, which can then be directly screened for improved pharmaceutical benefits and reduced side effects.

DETAILED DESCRIPTION OF THE INVENTION

The invention generally is related to a method and system for conducting high-throughput, microscale chemical reactions, and detecting a desired feature of each reaction. The invention can be used, for example, to test side effects of a drug in humans. A reaction between a drug and an encapsulated human metabolic enzyme on the apparatus can produce a product, called a metabolite. If a cell-based assay using human cells is applied to the apparatus, and the cells at a location are killed or otherwise undergo a measurable physiological or morphological change by the metabolite produced at that location, it indicates that the drug will likely have an effect, which may be toxicity. The invention can also be used, for example, to optimize a potential drug candidate or pharmacophore to improve its efficacy and/or reduce its side effects. For example, a promising anticancer drug can be applied to the apparatus. A reaction between the drug and each encapsulated enzyme in the array can produce an array of closely related drugs. A cell based assay including, for example, cancerous cells, can be applied to the array. In this case, death of the cells at a particular location indicates likely anticancer activity of the compound produced by the initial drug and the enzyme at that location. An apparatus can be constructed that combines this approach with the side effect test, thereby producing a new, more effective drug and simultaneously testing the new drug for side effects.

As used herein, an independent micromatrix is a piece of matrix material that is less than about one microliter in volume. A micromatrix is generally greater than 1 picoliter in volume, and generally not less than about 100 picoliters. Alternatively, a micromatrix is less than about 1 microliter, preferably less than about 500 nanoliters, or less than about 250 nanoliters or less than about 50 nanoliters or less than about 5 nanoliters in volume. Alternatively, a micromatrix is less than about 500 picoliters in volume. Preferably, a micromatrix is between about 250 picoliters and about 10 nanoliters in volume.

The material of a micromatrix is permeable to small molecules, including constituents of applied compositions such as drugs and their reaction products with test compositions. Preferably, the micromatrix is impermeable (or substantially impermeable) to the encapsulated enzyme or other test composition, thereby retaiing, or substantially retaining the test composition or enzyme from leaching out of the micromatrix. Suitable micromatrix materials include substituted and unsubstituted solgels and hydrogels. Each micromatrix can be the same or different material. The matrix material can be substituted or unsubstituted and includes a solgel, a hydrogel, a polyacrylamide, a polyacrylate, a polyvinyl alcohol, polyvinylene, or a polyvinyl silicate, such as a polyacrylate substituted with a sugar comprising sucrose, glucose, galactose, trehalose, mannose, or lactose. In another embodiment, the matrix material is a substituted or unsubstituted solgel. In a preferred embodiment, the matrix material is a substituted or unsubstituted solgel containing an enzymatic activity enhancing amount amount of polyvinyl alcohol.

A solgel, for example, is a tetramethoxyorthosilicate, a methyl-trimethoxyorthosilicate, a tetraalkoxyorthosilicate, or a trialkoxyorthosilicate. A hydrogel is, for example, a polyacrylamide, a polyacrylate, a sugar-substituted polyacrylate, or a polyvinyl alcohol. A polysaccharide gel is, for example, an alginate, a dextran, a starch, a cellulose, a carrageenan, a poly(hyaluronic acid), a heparin, a guar, or an inulin. Other polymers include a polyvinylene, a poly (vinyl acetate), a poly(ethyl vinyl ether, a polyacrylate such as a polymethyl methacrylate, a polystyrene, a polyvinyl silicate, a polyurethane, a polyalkanoate, a poly(lactic acid), a poly (3-hydroxybutyrate), or substituted variations thereof.

Encapsulation means the test composition is contained essentially within the volume of a micromatrix. This is an important distinction from surface immobilization for two reasons. Encapsulation within the volume of a matrix often maintains the activity of enzymes better than surface immobilization. Furthermore, the volume of a matrix can contain far more enzyme than can be attached to a surface area equal to the footprint of a micromatrix. More enzyme leads to faster, more complete reactions, which means, for example, that more reaction products can be produced, which leads to easier detection. Depending on the matrix material precursor, a test composition can be physically trapped or caged, and/or can be covalently attached by a chemical bond, or tethered. Preferably, a test composition is only physically trapped, because covalent modification of test compositions, for example, enzymes, can reduce their activity.

Appropriate matrix materials, and encapsulation of compositions therein are described in the literature, including: U.S. Pat. No. 5,854,030; U.S. Pat. No. 5,618,933 U.S. Pat. No. 5,474,915; Park, C.; Clark, D. 2002 Biotechnol Bioeng., 78, 229-235; Kim, Y; Park, C.; Clark, D. 2001 Biotechnol Bioeng., 73, 331-337; Wang, P., Sergeeva, M. V., Lim, L., and Dordick, J. S. 1997, Nature: Biotechnology 15: 789-793; Novick, S. J. and Dordick, J. S. 2000, Biotechnol. Bioeng. 68: 665-671; Sergeeva, M. V., Paradkar, V. M., and Dordick, J. S. 1997, Enzyme Microb. Technol. 20: 623-628; Novick, S. J. and Dordick, J. S. 1998, Chem. Mat. 10: 955-958; Kim, J., Dedeo, R. and Dordick, J. S. 2002; Biotechnol. Progress. The entire teaching of the preceding works are incorporated herein by reference. See Examples 1 and 2 for more details.

In another embodiment of the apparatus, the micromatrices are fixed on a solid support. A solid support can be, for example, a semiconductor wafer, a glass or quartz microscope slide, a metal surface, a polymeric surface, a monolayer coating on a surface, the exterior surface of a probe, the interior surface of a channel or conduit, and the like. Preferably, the solid support is a flat, thin solid, such as a glass microscope slide or a silicon wafer. The micromatrices are also separated on the solid support. Preferably, the micromatrices are fixed in a regularly spaced, two-dimensional array on the solid support, for example, located at the vertices of an imaginary square grid on the surface of the support.

Preferably, the solid support includes a physical barrier that isolates at least one micromatrix from at least one other micromatrix. For example, each micromatrix, or a group of micromatrices, can be fixed in a well, channel, conduit, or depression; or be fixed on a raised platform; or be surrounded partially or totally by a raised wall or barrier; or surrounded partially or totally by a depressed channel; or some combination thereof.

The inclusion of a physical barrier overcomes a potential problem with microarrays, namely, controlling "cross-talk" from mixing or dilution of applied compositions and reaction products between adjacent micromatrices. This problem can also be overcome by controlling the volume of liquid used in an applied composition. For example, if each micromatrix, occupying a volume of about one microliter, is placed in a microwell of total volume of about ten microliters, the volume of applied composition should be less than about nine microliters.

Alternatively, "cross-talk" can be desirable in a particular experiment. For example, a drug can be tested for side effects caused by reaction of its metabolite from one enzyme with a second enzyme. Two micromatrices can each be located in the same microwell, or alternatively, in a support without physical barriers, an excess volume of applied composition can be used so that the metabolite is washed from its originating micromatrix to an adjacent micromatrix.

The distance separating the micromatrices depends on a number of factors, including the size of the micromatrices, the resolution of the micromatrix fabrication technique, the volume of liquid in an applied composition, the presence of physical barriers in the solid support separating micromatrices, etc. For example, if the micromatrices are deposited on the solid support by hand, the spacing will limited by the dexterity of the experimenter. There are commercially available robotic microarray spotters that can deliver volumes as small as 100 picoliters or smaller. As a practical limit, adjacent micromatrices should be separated from each other by greater than about twice the diameter of the average spot.

In another embodiment, two or more micromatrices each encapsulate a distinct test composition. In an alternative embodiment, groups of micromatrices are included wherein each micromatrix within a group encapsulates a distinct test composition compared to each other micromatrix in its group. For example, a microarray to determine the response of common metabolic profiles to a xenobiotic could include 5×5 sub-arrays of 25 micromatrices each. Each micromatrix could contain one of 25 enzymes of interest. Each sub-array could differ by the amounts of each of the 25 enzymes in each micromatrix, or by the specific amino acid sequence of each of the 25 enzymes, etc. For example, for a high-throughput capability microarray designed to model 100 different metabolic liver enzyme profiles, 100 sub-arrays per slide can be prepared, each sub-array representing the liver P450 metabolic profile of an individual, a related group of individuals, a population subgroup, a pathological profile, and the like. In a preferred embodiment, each micromatrix encapsulates a distinct composition.

Individual micromatrices can be prepared from solutions of precursors using manual pipetting, but the creation of a microarray for high throughput analyses can best be accomplished by using a commercially available robotic microarray spotter. The spotting and reactions should be performed in a constant humidity chamber within the robotic spotter, thereby preventing dessication of the solgel micromatrices once formed. If necessary, glycerol can be added to the spotting solution to retard evaporation, in an amount between about 0.01% and about 5% by weight of the total solution. In an alternative embodiment, the step of encapsulating is selected from the group consisting of producing a micromatrix in the presence of one or more distinct test compositions,. Another embodiment of the method is the step of combining one or more distinct test compositions with a micromatrix material. See Examples 1 and 2 for more details.

A robotic microarray spotter can be used in a number of ways relevant to the invention, including to prepare arrays of micromatrices on a surface, to add applied compositions to individual test compositions, to remove multiple samples in parallel from multiple interaction sites, and to add cell based assay preparations to the microarray. Of the many commercial spotters available, there are, for example, contact pin spotters such as the GeneTAC $G^3$ (Genomic Solutions, Lansing, Mich.) and piezoelectric (inkjet mechanism) spotters such as the NANO-PLOTTER NP1.2™ (GeSiM mbH, Grosserkmansdorf, Germany).

As used herein, test compositions or applied compositions can be the same or different. Those that are distinct are those that vary in some measurable physical, chemical, or biological property and can differ in number of components, molecular formula, isotopic composition, structural formula, pH, sequence (of amino acids, DNA bases, RNA bases, monomers, etc), protein folding structure, presence or absence of cofactors, species, isoform, lifecycle, tissue origin, cancerous/noncancerous state, and the like.

A test composition comprises an indicator, a chemical compound, a biochemical compound, a catalyst, a cell extract, a cell fragment, or a cell, where at least one test composition comprises a constituent of biological origin. A constituent that is of, for example, biological origin, can be directly derived from an organism or it can be a chemically synthesized or genetically engineered copy or analog of a constituent derived from an organism. Optionally, a test composition comprises a constituent of mammalian origin. In another alternative, a test composition comprises a constituent of human origin. In still another embodiment, a test composition can comprise an enzyme, a cofactor, an antibody, a cell, a cell fragment, or a cell extract. Alternatively, each test composition comprises at least one enzyme and its associated cofactor. Preferred enzymes can be anyone one of those belonging to the six classes of enzymes slid include oxidoreductases, transferases, hydrolases, lyases, isomerases and ligases. More preferably, each test composition comprises at least one cytochrome P450 enzyme isoform and its associated cofactor. Most preferably, the test composition is a single cytochrome P450 enzyme isoform and its associated cofactor.

An applied composition includes one or more constituents that have the potential for reaction with a test composition. For example, if a test composition is a human metabolic enzyme, an applied composition could be a drug. In general, applied compositions will contain at least one constituent that may be termed a xenobiotic, which is any compound that is foreign to an organism. As used herein, a xenobiotic also includes compounds that are foreign to an organism's normal function. Examples include a naturally occurring peptide that has an elevated concentration in a diseased organism, or a natural protein that has an unnatural folding configuration, as in a prion-related disease. In one embodiment, the applied composition further comprises a hydrogel, a protein gel, a polysaccharide gel, a cellulose, a gelatin, a polystyrene, or a polyacrylamide. In a preferred embodiment, the applied composition further comprises a hydrogel selected from the group consisting of polyvinyl alcohol, collagen, carrageenan, poly(hyaluronic acid), and inulin. In a preferred embodiment, the applied composition includes collagen.

The applied composition can be added to the microarray in a number of ways. If a single applied composition is to be added to an array containing distinct test compositions, biocatalytic reactions can be initiated by dipping the array into a solution (aqueous, organic, or mixed aqueous-organic cosolvent) of applied composition and allowing the substrate to diffuse into the printed biocatalyst. After removing the microarray from the bulk substrate solution and shaking off excess substrate and/or drying the slide, bio-transformations of the lead compound proceed within each matrix. In a second method, the lead compound can be added to the array using a robotic microarray spotter, which can deliver precise volumes of a distinct applied composition to a distinct test composition in the array.

The volume of applied composition solution added should be optimized to provide efficient wetting of each micromatrix and enable effective partitioning of the applied composition into the micromatrix. For example, the volume of the applied composition solution added can be between about 0.2 and about 5 times the volume of each micromatrix. Alternatively, the volume of the applied composition solution added can be between about 0.5 and about 2 times the volume of each micromatrix. In a preferred implementation, the volume of the applied composition solution should be about the volume of each micromatrix.

The applied composition solution should be spotted containing a specific concentration of the active constituent(s). For example, in a lead optimization, the objective is to chemically modify a lead compound by catalysis in each micromatrix by each test composition. Thus, it can be effective to use an applied composition where the concentration of the active constituent(s) effectively saturates one or more enzymes in the array. By contrast, in a toxicity experiment, using a concentration high enough to saturate the enzymes in the array may not provide biologically relevant information, particularly if the concentration is high enough to force saturation binding of even weakly bound constituents, or if the concentration is much higher than could conceivably be expected in a biological system. In each case, the determination of concentration has to be made with respect to the objectives and the composition of the applied composition and test compositions.

A further embodiment of the method comprises the step of combining a distinct applied composition with a distinct test composition. Many possible variations are inherent in this embodiment. For example, an applied composition can be tested against numerous distinct test compositions in parallel, e.g., a chip with several thousand distinct encapsulated enzymes could be dipped in a solution containing a single drug. In another variation, numerous distinct applied compositions can each be tested against individual test compositions in parallel. For example, on a chip with a 10×10 array of 10 distinct enzymes, each enzyme in a column is identical, and a robotic microarray spotter applies 10 distinct drug candidates across the 10 rows, leading to 100 distinct reactions. Alternatively, numerous distinct applied compositions can be combined in a predetermined manner with numerous distinct test compositions in parallel. For example, a 10×10 array can contain 100 distinct enzymes and a robotic microarray spotter can apply 100 distinct drug candidates, leading to 100 distinct reactions. Alternatively, the product of a reaction can be combined with a second test composition, leading to a second product. For example, after reaction, an aspiration probe can remove a sample containing a reaction product from a first encapsulated enzyme, and apply it to a second encapsulated enzyme, thereby producing a second product.

Another embodiment of a method of the invention includes the steps of removing a sample from an interaction site, and applying the sample to a micromatrix encapsulating a second distinct test composition. This could be accomplished, for example, by using a probe, such as an aspiration probe or a contact probe to remove the sample, and then using the probe to apply the sample to a different test composition. The probe could be, for example, a single probe or could be part of an array of probes as part of a robotic microarray spotter. Alternatively, multiple interactions could be conducted by using a large excess of applied composition, whereby the excess solvent of the applied composition directs a product of the interaction to an adjacent micromatrix.

In another embodiment, the applied composition further includes a competitive inhibitor of a constituent of the test composition. In another embodiment, the test composition includes a competitive inhibitor of a constituent of the test composition. In yet another embodiment, the applied composition is combined with a distinct test composition. In still another embodiment, a distinct applied composition is combined with the test composition. In a preferred embodiment, a distinct applied composition is combined with a distinct test composition.

Reactions that can be conducted on the disclosed apparatus include chemical reactions that transform an applied composition into a reaction product, for example, reacting a drug with a human metabolic enzyme to produce a drug metabolite. A chemical reaction also includes temporary interactions between compounds that lead to a signaling event, such as reversible binding of a substrate by an enzyme that leads to a color change. To conduct a reaction, an applied composition, for example, a drug, is applied to each micromatrix encapsulated enzyme in an array.

The method disclosed herein can be used to conduct numerous specific kinds of chemical reactions include, among others, condensation, acylation, dimerization, alkylation, rearrangement, transposition, decarbonylation, coupling, aromatization, epoxidation, disproportionation, hydrogenation, oxidation, reduction, substitution, isomerization, stereoisomerization, functional group conversion, functional group addition, elimination, bond cleavage, photolysis, photodimerization, cyclization, hydrolysis, polymerization, binding, such as between a receptor and a ligand; inhibition, such as between an enzyme and an inhibitor; recognition, such as between an antibody and a hapten; activation, such as between an agonist and a receptor; inactivation, such as between an antagonist and a receptor; and the like.

Conditions suitable for conducting reactions include physical conditions such as temperature, pressure, and reaction time. Also included are chemical conditions such as concentration, solvents, and consumable reagents such as a co-substrate, enzyme cofactors, pH, consumable reagents (such as adenosine triphosphate and nicotinamide adenine dinucleotide phosphate), and the like. In the context of cell-based assays, suitable conditions include temperature, water, growth time, growth nutrients, and the like.

An embodiment of the disclosed apparatus includes a detector. A detector assays a desired feature, i.e., physical, chemical, or biological evidence of reactions, for example, color changes due to binding of a drug by an antibody, molecular weights of drug metabolites produced by a metabolic enzyme, or the toxicity of a drug metabolite to cancerous cells. A detector comprises electrode, an aspiration probe, a laser desorption probe, an ion beam desorption probe, a gas desorption probe, a liquid desorption. probe, a contact probe, an optical spectrometer, a microscope, an imager, a mass spectrometer, a chromatography apparatus, an electro chemical detector, a particle detector, a chemical affinity detector, a radiation detector, a magnetic resonance spectrometer, or the components to perform a cell proliferation assay, a cytotoxicity assay, an immunoassay, a binding assay, or a staining assay. Some of the components comprised by the detector, such as the various probes, are not necessarily detectors per se but function to remove a sample and direct it to another component of the detector. In an alternative embodiment, the detector comprises an aspiration probe, an optical spectrometer, a microscope, an imager, a mass spectrometer, or a cell based assay, such as a cell proliferation assay or a cytotoxicity assay. In a preferred embodiment, the detector includes a cell proliferation assay or a cytotoxicity assay.

In the disclosed method, desired features of reactions can be assayed via detection in situ or by removing a sample for analysis. In situ detection can be conducted by the detector of the disclosed apparatus. For detection off the apparatus, samples can be removed using aspiration, laser desorption, ion beam desorption, gas desorption, liquid desorption, contact removal, and the like. Aspiration, for example, removes a liquid sample by drawing a vacuum, laser desorption uses laser energy to volatilize a sample from a solid or liquid phase into a gas phase, contact removal applies a probe to a sample, whereupon a portion of the sample adheres to the probe, gas desorption, similar to aspiration, directs a gas across a site to entrain a sample in the gas stream, and the like. Removed samples can be assayed by the detector of the disclosed apparatus, or by another detector. A particular embodiment involves the use of a cell based assay, which includes detecting cell proliferation, cell death (cytotoxicity), and other metabolic or morphological changes in cells. These assays can be performed using both cell monolayer overlays, which cover at least a portion of the apparatus, and gel droplets, which cover only one micromatrix. Cells used in the monolayer overlays and the gel droplets can be cultured in natural or synthetic gels including a hydrogel, a protein gel, a polysaccharide gel, a cellulose, a gelatin, a polystyrene, or a polyacrylamide.

Thus, the invention also includes the embodiment where the apparatus or microarray are overlayed or covered by a second matrix containing a second test composition. Suitable test compositions include those employed in the micromatrices. The second matrix applied to the microarray as a single layer or film across the entire substrate. Alternatively, the second matrix can be added in discrete and independent droplets over each micromatrix, thereby permitting the test compositions in the second matrix to be different.

The P450 isoforms found in the human liver provides a representative example of how test composition constituents can be selected and used in the present invention. The human liver includes 16 major isoforms responsible for the vast majority of xenobiotic metabolism (Table 1). A summary of the relative amounts of P450 isoforms responsible for drug metabolism in the uninduced human liver is given in Table 2. This distribution can be reproduced in micromatrix sub-arrays. Further, this capability can be expanded to accommodate differences in P450 isoform levels, and mutations among isoforms, allowing investigation of the influence of P450 variability on drug metabolism in an individual, a related group of individuals, a population subgroup, a pathological profile, and the like.

TABLE 1

Summary of Commerically Available P450 Isoforms, their Substrates (Xenobiotics), and Known Inhibitors

| P450 Isoform | Representative Substrates (fluorogenic ones given in bold) | Representative Inhibitors |
|---|---|---|
| 1A1 | PAHS (e.g., benzo[a]pyrene, pyrene), 7-ethoxyresofuffin | Ellipticine |
| 1A2 | Aromatic amines, PAHs, caffeine, coumadin, 3-cyano-7 etboxycoumarin | Furafylline, verapamil, diltiazem |
| 2A6 | Coumarin, nicotine, steriods, vaiproic acid | Trancypromine, diethyldithiocarbarnate |
| 2C8 | Paclitaxel, ibuprofen, dibenzylflourescein | Quercitin, omeprazole |
| 2C9 | Dieolfenac, ibuprofen, omeprazoic, coumadin, tamoxifen, dibenzylfluorescein | Sulfaphenaole, cimetidine, fluotetine, valproic acid |
| 2C18 | Imipramine, naproxen, omeprazole | Cimetidine, fluoxetine, omeprazole |
| 2D6 | Caropril, dextramethorphan, tramadol, codein, 3-[2-($n_3$N-diethyl-N-methylamine)ethyl]-7-methoxy-4-methylcoumarin | Qunidine, codeine, haloperidol, valproic acid |
| 2E1 | Acetaminophen, chlorzoxezone, 7-methoxy-4-trifuloromethyl-coumarin | Diethylidithiocarbamate, ritonavir |
| 3A4 | Atorvastain, cortisol, cyclophosphamide, digitoxin, indinavir, loratidine, lovastatin, paclitaxel, tamosifen, testoterone, terfenadine, dibenzylfluorescein | Ketoconzaole, erythromycin, fluconazole |
| 3A5 | Cortisol, lovastatin, terfenadine | Ketoconazole, Miconazole |
| 3A7 | Cortisol, lovastatin, terfenadine | Ketoconazole, miconazole |
| 4A11 | Lauric acid | 1-Aminobenzotriazole |
| 4F2 | Arachadonic acid, Leukotriene $B_4$ | 17-Octadecynoic acid |
| 4F3A & B | Leukotriene $B_4$ | Quercitin, ketoconzaole |

TABLE 2

Representative Distribution of P450 Isoforms in the Human Liver[34]

| P450 Isoform | Average % of Total Liver P450 |
|---|---|
| 1A2 | 13 |
| 2A6 | 4 |
| 2B6 | 1 |
| 2C8, 2C9, 2C18, 2C19 | 18 |
| 2D6 | 2.5 |
| 2E1 | 7 |
| 3A4, 3A5 | 28 |

In the foregoing, each test composition contains an individual P450 isoform. To more accurately represent targets of interest, for example, the in vivo environment of the liver, different and/or multiple combinations of P450 isoforms can be included in each distinct test composition. For example, a 5×5 sub-array format can be used to examine metabolites of a drug or xenobiotic in the presence of different levels and ratios of P450 isoforms. For example, an applied composition can contain cyclophosphamide (a prodrug precursor to 4-hydroxycyclophosphamide) in combination with a 5×5 sub-array wherein each of the 25 micromatrices encapsulate different levels of CYP3A4 and CYP2B6, two human liver P450 isoforms. The 5×5 sub-array can be prepared where each micromatrix in the cluster contains either or both of the two P450 isoforms, and the relative amounts of the two P450 isoforms can be adjusted by spotting different ratios. Upon adding cyclophosphamide, this can result in a secondary reaction by the second P450 isoform or result in inhibition of the second P450 isoform. In another alternative, if only one isoform is used per test composition, an excess of the applied composition solution can be added, whereby products from reaction with one isoform, by means of the excess volume, contact adjacent test compositions. Either alternative can approximate the behavior of cyclophosphamide metabolism in the human liver. See Example 2 for more details.

In the foregoing, liver P450 enzymes were used as particular illustrative examples, due to their importance in human metabolism. However, this should not be construed as a limitation. For example, a wide variety of other enzymes from other organs, and other organisms can be used, as cited above. Enzymes that recognize substrates instead of transforming them, such as receptors, can be used. Catalysts other than protein enzymes can be used, such as catalytic antibodies, chemical catalysts, or RNA enzymes. Cell extracts that contain multiple cell components can be encapsulated, providing for multi-step interactions of applied compositions.

The application of cell based assays, including cytotoxicity and cell proliferation, as detection techniques in the disclosed method can be understood in the following implementation of a cell proliferation assay. The cells to be used in the assay can be entrapped in hydrogel droplets, which can be spotted directly over each interaction site. The use of hydrogels to support and restrain the cells allows cell based assays to be applied to each micromatrix site, whereby each assay responds to the products associated with the micromatrix it covers and therefore each assay result can be distinguished. A hydrogel is a matrix material, such as collagen, hyaluronic acid, polyvinyl alcohol, polysach-harides, etc, that be used to support and restrain cells in a specific area. Note that the hydrogel matrix material used in a cell-based assay, while potentially made of the same material as the micromatrices, is distinct from the micromatrices.

Following application of the hydrogel droplet culture, the cells can be allowed to grow for an extended period of time, e.g., one week, while exchanging the growth medium according to standard protocols, during which time growth can be monitored by standard staining and image analysis techniques. The determination of an appropriate incubation time is an individual experimental decision based on standard protocols for the cells in use and the experiment's objectives.

There are a wide variety of cells that can be used in such assays. Determination of which cell to use depends on the purpose of the particular experiment. For example, in optimizing a new cancer drug lead, one experiment would use a cytotoxicity assay employing cancerous cells, where cell death is the sought after result. In another experiment, the same array can be used in combination with normal cells, for example, for the same organ as the cancerous cells, in order to determine the toxicity of the optimized drug leads; here, cell proliferation is the desired result. Correlation of the two experiments allows optimized lead compounds to be ranked according to their desirable toxicity to cancer cells vs undesirable toxicity to normal cells. Cells that can be used, or the tissues/organs they can be derived from, include, but are not limited to bone marrow, skin, cartilage, tendon, bone, muscle (including cardiac muscle), blood vessels, corneal, neural, brain, gastrointestinal, renal, liver, pancreatic (including islet cells), cardiac, lung, pituitary, thyroid, adrenal, lymphatic, salivary, ovarian, testicular, cervical, bladder, endometrial, prostate, vulval, esophageal, etc. Also included are the various cells of the immune system, such as T lymphocytes, B lymphocytes, polymorphonuclear leukocytes, macrophages, and dendritic cells. In addition to human cells, or other mammalian cells, other organisms can be used. For example, in optimizing a pesticide lead compound, nerve cells from the target organism could be used. In another example, in testing for environmental effects of an industrial chemical, aquatic microorganisms that could be exposed to the chemical can be used. In still another example, organisms such as bacteria that are genetically engineered to possess or lack a certain trait could be used. For example, in the optimization of an antibacterial lead compound for combating antibiotic resistant organisms, the cell assay could include cells that have been engineered to express one or more genes for antibacterial resistance.

In an anti-cancer drug lead optimization, for example, a cytotoxicity assay will use cancerous cells. Examples of cells that could be used include a breast cancer cell line (MCF7), a human hepatocyte (HepG2 cells), and a kidney cell line (A-498 cells). MCF7 cells can be grown as monolayers in T-25 flasks containing buffered phenol-red free DMEM medium supplemented with 10% (v/v) fetal bovine serum, glucose (4.5 g/L), and glutamine (2 mM) in a humidified incubator at 5% (v/v) $CO_2$ at 37° C. The cell culture medium should not be supplemented with antibiotics. Monolayer cultures of HepG2, a human hepatoblastoma cell line, can be grown in DMEM medium as recommended by the American Type Culture Collection and described by Schamagl et al. (2001)[32], except that antibiotics should not be added to the medium. ATCC recommends against using antibiotics when culturing HepG2 cells (ATCC Technical Services), and, in general, antibiotics can undergo undesirable biotransformations catalyzed by enzymes in the micromatrices. A-498 cells, a human kidney carcinoma cell line, can be grown in supplemented DMEM as recommended by ATCC.

After allowing reactions between applied compositions and test compositions to proceed, cell monolayers can be transferred from the tissue culture flask to the microarray for cytotoxicity assays. The transfer procedure is be similar to that described by Ziauddin and Sabatini (2001)[33] for cell microarrays expressing defined cDNAs. The microarray can then be immersed in a tissue culture dish containing the appropriate medium, incubated at 37° C. for 48 h, and stained for viability.

A potential problem with the hydrogel cell assay methods can be cross talk, similar to that discussed in a preceding section on the solid support. Here, mixing and dilution of test composition-generated products can occur in the liquid medium surrounding the individual drops. Three scenarios could be possible: (a) the collagen gel is surrounded by excess liquid medium (i.e., the chip can be immersed in a solution of medium during the growth-inhibition assays); (b) the growth medium is confined to the collagen gel only, thus preventing possible transport of compounds from one collagen-gel droplet to another; or (c) as disclosed for the apparatus, each site or subarray of sites on the microarray is provided with a physical barrier, such as a microwell, whereby the accompanying liquid growth medium is contained by the barrier.

In scenario (a), there is no cross talk because the particular interaction to be studied involves applied compositions or subsequent products that diffuse slowly on the timescale of the analysis. Scenario (c) was discussed in a preceding section. Scenario (b) requires that cells are able to grow in a medium-filled hydrogel matrix without the presence of a surrounding liquid reservoir. For example, hydrogel drops can be prepared and inoculated with cells as described previously, with the following modifications. A cell suspension (containing ca. $4 \times 10^5$ cells/mL) can be combined with UV-sterilized collagen solution and 30X medium (30X DMEM with 10% FBS). Collagen gel drops containing different concentrations of medium can be prepared by mixing these reagents in the following proportions: 0.1 mL cell suspension+1 mL collagen+0.2 mL 30X medium; 0.1 mL cell suspension+0.8 mL collagen+0.4 mL 30X medium; 0.1 mL cell suspension+0.6 mL collagen+0.6 mL 30X medium. The collagen spotted slides can then be incubated in 5% (v/v) $CO_2$ at 37° C. for up to 3 days, and the cells stained for viability with a Live/Dead test kit (Molecular Probes). See Example 2 for more details.

EXEMPLIFICATION

The present invention is illustrated by the following examples, which are not intended to be limiting in any way.

Example 1

Solgel Enzyme Microarrays

Solgel micromatrices containing active enzymes were stabilized on glass at near-neutral pH and room temperature. A multi-well bilayer of polydimethylsiloxane (PDMS) was used to support the matrix array and contain the reaction medium. The enzymes in the solgels were catalytically representative of their solution counterparts; a good linear correlation (R=0.98) was obtained when the activity of the solgel enzymes were plotted against the activity of the soluble hydrolases. The solgel arrays were reusable and exhibited greater thermostability when compared to soluble enzymes.

The enzyme-containing solgel arrays were further miniaturized by spotting micromatrices on microscope slides. An enzyme-containing solgel microarray was generated containing 300 solgel micromatrices on a glass microscope slide.

Example 2

P450 Microarrays

Sol solution was prepared by mixing 25 µl methyltrimethoxysilane (MTMOS) with 10 µl polyvinyl alcohol (PVA, MW 10,000) in distilled water (10% w/w). The resulting sol had a pH of 2, and the formed gel was then neutralized quickly by washing with aqueous buffer. To prevent detachment of solgel matrices from the glass slide and to make hemispherical matrices, MTMOS solution (pH7) was spin coated (2 µl at 3000 rpm for 30 s) onto the glass. The reactions were performed in arrays containing 150 solgel matrices, each with a volume of 1 µl prepared using a manual micropipeter. P450 activity was tested as follows: 0.5 µl green fluorescent substrate (2 mM, DBOMF, a fluorescein analog), 2.5 µl NADP+ (10 mM) and 2.5 µl regeneration system (glucose 6-phosphate dehydrogenase plus glucose 6-phosphate) were added to 94.5 µl phosphate buffer (200 mM, pH 8). P450 activity was assayed by spotting 5 µl applied composition solution onto the 1 µl solgel matrix containing the P450 (0.14 pmol or ca. 5.6 µg/mL of the hydroxlase component), and the relative fluorescence intensity was monitored vs. time using a plate reader (the glass slide sitting atop a 384-well plate) at an excitation wavelength of 485 nm and emission wavelength of 535 mn.

The reactivity of CYP3A4 in the solgel matrix compared to the enzyme in aqueous solution is summarized in Table 3. The intrinsic activity of the P450 in the solgel was high, with a $V_{max}$ nearly identical to the native enzyme formulation in aqueous solution. Thus, the process of incorporating the multicomponent CYP3A4 test composition into the solgel did not affect the $V_{max}$ of the enzyme. Moreover, the enzyme reaction was not limited by diffusion; calculation of the Observable Modulus yielded a value less than 1, indicating that the reaction was kinetically limited.

TABLE 3

Kinetic Constants of CYP3A4

| Enzyme Form | $V_{max}$ (nmol/min/nmol P450) | $K_m$ (µM) | $V_{max}/K_m$ (min$^{-1}$) |
|---|---|---|---|
| Soluble | 0.69 | 12.7 | 0.060 |
| Solgel | 0.61 | 215 | 0.0031 |

In addition to the kinetic constants summarized in Table 3, the following data has been obtained for sol-gel preparations of 1 µl and below. These values are given in Table 4. These results were obtained by spotting sols onto a glass microscope slide using a microarray spotter.

TABLE 4

Additional data

| Solgel Volume | Initial Rate (nM/min/nM-P450) |
|---|---|
| 1000 nL | 0.85 |
| 125 nL | 0.80 |
| 100 nL | 0.75 |
| 25 nL | 0.70 |

Example 3

Cell Growth in Collagen-Gel Droplets and Pro-drug Activation

Solgel matrices were prepared as described above, except for one modification involving spin coating. Specifically, the MTMOS spin coat can be hydrophobic and can be insufficiently wetted by the collagen gel, thereby resulting in poor attachment of the collagen gel onto the slide. To prevent detachment of solgel matrices from the glass slide and to produce hemispherical matrices, polymaleic anhydride-alt-α-olefin (PMA-OL) in toluene was spin coated (2 ml at 3000 rpm for 30 s) onto the glass. The P450 reactions (involving CYP3A4) were then performed in arrays containing 40 solgel matrices, each with a volume of 1 µl prepared using a manual micropipetter. For the P450 reaction, 5 µl substrate solution (1 mM cyclophosphamide and 2 mM NADPH) was spotted on the P450 solgel and incubated for 2 h at 30° C. to produce 4-hydroxycyclophosphamide as a product toxic to MCF7 breast cancer cells[31]. Cyclophosphamide is a known prodrug against MCF7 cells and can be metabolized to active compounds, such as 4-hydroxycyclophosphamide, by CYP3A4 in the liver (Scheme I).

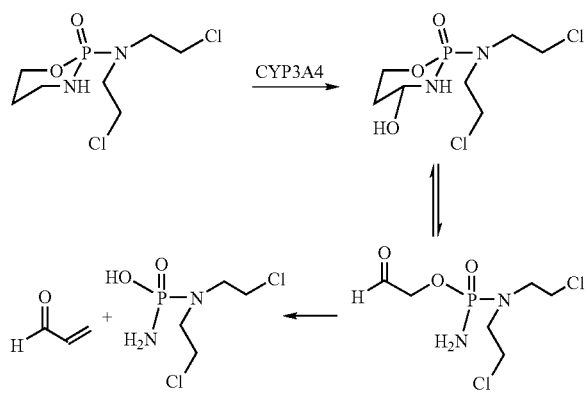

Scheme I shows the CYP3A4-catalyzed metabolism of cyclophosphamide. The primary metabolite is 4-hdroxycyclophosphamide, which is in equilibrium with aldophosphamide. The aldophosphamide spontaneously decomposes into phosporamide mustard, the alkylating agent, and acrolein.

Preparation and overlay of the collagen-gel matrices containing MCF7 cells was carried out by trypsinizing a confluent layer of MCF7 cells from a T-25 cell-culture flask, centrifuging the cell solution for 10 min at 800 rpm, and re-suspending the cells in 1 mL of FBS-supplemented DMEM medium. The cell suspension (0.2 mL, containing ca. $4 \times 10^5$ cells/mL) was then combined with 2 mL of UV-sterilized collagen solution (from rat tail) and 0.4 mL of 10X medium (10X DMEM with 10% FBS) adjusted to pH 7. Collagen gel droplets (5 µL, containing ca. 900 cells) were then spotted on top of each solgel matrix. After 30 min pre-incubation at room temperature; the spotted slide was overlaid with growth medium and incubated for two days.

After two days the medium was discarded and the Live/Dead test kit (Molecular Probes) was used to produce a green fluorescent response by living cells and a red fluorescent signal by dead cells. To this end, 20 µl of ethidium homodimer-1 (2 mM) and 5 µl of calcein AM (4 mM) were added to 10 mL of sterile tissue-culture grade PBS buffer, and 5 µL of this mixture was applied to each collagen drop. Following incubation at 37° for 30 min, each collagen gel matrix was observed with fluorescence microscopy. There was a significant increase in the number of dead cells (red spots) and the ratio of dead to live cells in the collagen gel matrix that contains CYP3A4.

These results indicate that CYP3A4 can be sufficiently active in solgel matrices to transform cyclophosphamide into its 4-hydroxy derivative, which is toxic to MCF7 breast cancer cells.

Example 4

Design of a Factorial Experiment to Optimize a Particular Array

Enzymes encapsulated in solgels can be active and stable with a $V_{max}$ nearly as high as in aqueous solution. To optimize enzyme activity and extend these preliminary results to other enzyme isoforms, a broad factorial design can be desirable to elucidate the effects of solgel formulation conditions on test composition activity and stability. For example, for p450 isoforms, key variables, and the range of parameters to be studied are summarized in Table 5. A second-order factorial design was used to study the influence of factors that have been identified as being critical in influencing P450 enzyme activity and stability: $H_2O$/MTMOS ratio, MTMPS/TMOS ratio, solution pH poly(vinyl alcohol) (PVA) concentration, and P450 concentration. Using commercially available fluorogenic enzyme variants can facilitate this optimization phase.

In an example of a factorial design, two levels and five factors yield $2^5$ experiments to be performed. In this optimization stage, the solgels can be arrayed manually to give 150 micromatrices per microscope slide using a 384-well plate as a visual template for the micromatrices. This enables use a fluorescent plate reader for the P450 assays. Kinetic constants ($V_{max}$ and $K_m$) and the observed half-life at room temperature of CYP3A4 can then be determined for each of the 32 experimental conditions to be studied. The moderate-throughput manual spotting can be suitable for this number of experiments of CYP3A4, as well as other P450 isoforms (see Table 1).

TABLE 5

Factors and Factor Settings for a $2^5$ Factorial Design

| Factor | Low setting | High setting |
| --- | --- | --- |
| $H_2O$/MTMOS ratio (v/v) | 0.5 | 3 |
| MTMOS/TMOS ratio (v/v) | 0.25 | 3 |
| Solution pH | 2 | 8 |
| PVA concentration (w/v) | 1 | 10 |
| P450 concentration (nmol/mL) | 0.01 | 0.2 |

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
  (a) a solid support; and
  (b) a plurality of independent, micromatrices on said solid support, wherein each of said micromatrices (i) have a volume of less than about one microliter, (ii) encapsulate at least one test composition comprising a protein, in the absence of covalent bonding of said test composition to the micromatrix and in the absence of covalent bonding of said test composition to the solid support (iii) are not separated from each other by a physical barrier, (iv) are substantially impermeable to the test composition and (v) are permeable to an applied composition comprising a constituent that has potential for reaction with the test composition.

2. The apparatus of claim 1, wherein each micromatrix has a volume less than about 250 nanoliters.

3. The apparatus of claim 2, wherein said micromatrices are fixed in a regularly spaced, two-dimensional array on said solid support.

4. The apparatus of claim 2, wherein at least two said micromatrices each encapsulate a distinct test composition.

5. The apparatus of claim 3, wherein each said micromatrix is made of a material comprising a solgel, a hydrogel, a polyacrylamide, a polyacrylate, a polyvinyl alcohol, a polyvinylene, or a polyvinyl silicate, and wherein said material is substituted or unsubstituted.

6. The apparatus of claim 5, wherein said material is a solgel.

7. The apparatus of claim 5, wherein said test compositions comprise at least one protein constituent of biological origin.

8. The apparatus of claim 7, further comprising a detector, wherein said detector comprises components to perform a cell proliferation assay, a cytotoxicity assay, an immunoassay, a binding assay, or a staining assay.

9. The apparatus of claim 7, wherein the test compositions comprise a constituent of mammalian origin.

10. The apparatus of claim 9, wherein the test compositions comprise a constituent of human origin.

11. The apparatus of claim 10, wherein each said test composition comprises an enzyme and its associated cofactor.

12. The apparatus of claim 11, wherein each said test composition comprises a cytochrome P450 enzyme isoform and its associated cofactor.

13. The apparatus of claim 12, wherein each said test composition consists of a single cytochrome P450 enzyme isoform and its associated cofactor.

14. A microarray, comprising
  a. a plurality of test compositions, wherein each test composition comprises at least one enzyme and its associated cofactor, wherein at least two said test compositions are distinct; and
  b. a microarray comprising a plurality of independent, permeable micromatrices that are spatially separated in a fixed array on a solid support, wherein
    i. each said micromatrix encapsulates one said test composition and is impermeable to said test composition;
    ii. each said micromatrix is a material comprising a solgel or a polyacrylate hydrogel and wherein said material is substituted or unsubstituted;

iii. each micromatrix has a volume less than about one microliter;
iv. said micromatrices are not separated from each other by a physical barrier; and
v. each micromatrix is permeable to an applied composition comprising a constituent that has potential for reaction with said test composition.

15. The apparatus of claim 12, further comprising components to perform a cell proliferation assay or a cytotoxicity assay.

16. The apparatus of claim 15, wherein the components comprise human cells.

17. The apparatus of claim 1, wherein each micromatrix has a volume less than about 50 nanoliters.

18. The apparatus of claim 1, wherein each micromatrix has a volume less than about 5 nanoliters.

19. A method for high-throughput screening to detect a reaction or reaction product having a desired feature, comprising the steps of
   a. providing an apparatus according to claim 1
   b. combining one or more distinct applied compositions with said micromatrices on said apparatus under conditions suitable for reacting said applied compositions with said test compositions; and
   c. assaying each reaction or reaction product in step (b) for a desired feature.

20. The method of claim 19, wherein the applied composition comprises polyvinyl alcohol, collagen, or hyaluronic acid.

21. The method of claim 19, wherein the reactions or reaction products are assayed by a method including a step comprising aspiration, laser desorption, ion bean desorption, gas desorption, liquid desorption, contact transferring, optical spectrometry, microscopy, digital imaging, photographic imaging, mass spectrometry, chromatography, electrochemistry, particle metrology, chemical affinity, radiation metrology, magnetic resonance spectrometry, cell proliferation assaying, cytotoxicity assaying, immunoassaying, binding, or staining.

22. The method of claim 21, wherein said micromatrices are fixed in a regularly spaced, two-dimensional array on said solid support.

23. The method of claim 22, wherein the reactions or reaction products are assayed by aspiration, optical spectrometry, chromatography, microscopy, digital imaging, and mass spectrometry.

24. The method of claim 22, further comprising the step of combining a distinct applied composition with a distinct test composition.

25. The method of claim 24, further comprising the steps of
   d. removing a sample from a reaction in step (b); and
   e. applying said sample to a second distinct test composition.

26. The method of claim 25, wherein each said micromatrix is comprised of the same material, wherein said material comprises a solgel, a hydrogel, a polyacrylamide, a polyacrylate, a polyvinyl alcohol, a polyvinylene, or a polyvinyl silicate, and wherein said material is substituted or unsubstituted.

27. The method of claim 26, wherein the micromatrices are combined with an applied composition by submerging the micromatrices in a solution comprising the applied composition.

28. The method of claim 27, wherein the reaction products of step (b) are assayed by the steps of
   f. covering the apparatus with cells;
   g. culturing the cells; and
   h. assaying the cells in the microenvironment of each micromatrix for a desired biological response.

29. The method of claim 28, wherein the cells are mammalian cells.

30. The method of claim 28, wherein the cells are culture in a collagen gel cultured.

31. The method of claim 28, wherein each test composition comprises a P450 enzyme.

32. The method of claim 31, wherein each test composition comprises an independently selected P450 enzyme or a combination of P450 enzymes.

33. The method of claim 32, wherein each test composition comprises the combination of P450 enzymes found in an independently selected tissue type.

34. The method of claim 33, wherein the applied composition comprises a drug substance or a xenobiotic.

35. The method of claim 34, wherein the reaction products of step (b) are assayed by the steps of
   i. covering the apparatus with cells;
   j. culturing the cells; and
   k. assaying the cells in the vicinity of each micromatrix for cytotoxicity.

36. The method of claim 28, wherein the cells are cultured in matrix comprising a hydrogel, a polysaccharide gel, a cellulose, a gelatin, a polystyrene, or a polyacrylamide.

* * * * *

UNITED STATES PATENT AND TRADEMARK OFFICE
CERTIFICATE OF CORRECTION

PATENT NO. : 7,267,958 B2 Page 1 of 1
APPLICATION NO. : 10/287442
DATED : September 11, 2007
INVENTOR(S) : Jonathan S. Dordick and Douglas S. Clark It is certified that error appears in the above-identified patent and that said Letters Patent is hereby corrected as shown below:

Column 17
Claim 21, Line 32, please delete "ion bean" and insert --ion beam--.
Claim 23, Line 43 (originally Claim 22) should be cancelled per the Examiner's Amendment in the Notice of Allowance dated July 16, 2007.

Column 18
Claim 30, Line 26, please delete "cultured" and insert --culture--.

Signed and Sealed this

Twenty-seventh Day of November, 2007

JON W. DUDAS
*Director of the United States Patent and Trademark Office*